United States Patent [19]

Houghton

[11] Patent Number: 4,841,911
[45] Date of Patent: * Jun. 27, 1989

[54] VARIABLE MAZE DEVICE

[76] Inventor: Paul Houghton, 16230 Skyline Blvd., Woodside, Calif. 94062

[*] Notice: The portion of the term of this patent subsequent to Mar. 1, 2005 has been disclaimed.

[21] Appl. No.: 162,026

[22] Filed: Feb. 29, 1988

Related U.S. Application Data

[63] Continuation-in-part of Ser. No. 878,999, Jun. 26, 1986, Pat. No. 4,727,825.

[51] Int. Cl.⁴ .............................................. A63F 9/06
[52] U.S. Cl. .................................. 119/29; 273/153 R
[58] Field of Search ............................ 119/29, 17, 19; 273/1 GA, 153 R, 153 S

[56] References Cited

U.S. PATENT DOCUMENTS 4,727,825  3/1988  Houghton ............................ 119/29

Primary Examiner—David A. Scherbel
Assistant Examiner—Creighton Smith
Attorney, Agent, or Firm—Irell & Manella

[57] ABSTRACT

A variable maze device for enriching the environment of a contained primate, or for use as a crib toy, the device including a variable and programmable maze as well as a mechanism whereby a contained primate or a human infant may be instructed as to the location of the correct pathway through the maze.

9 Claims, 2 Drawing Sheets

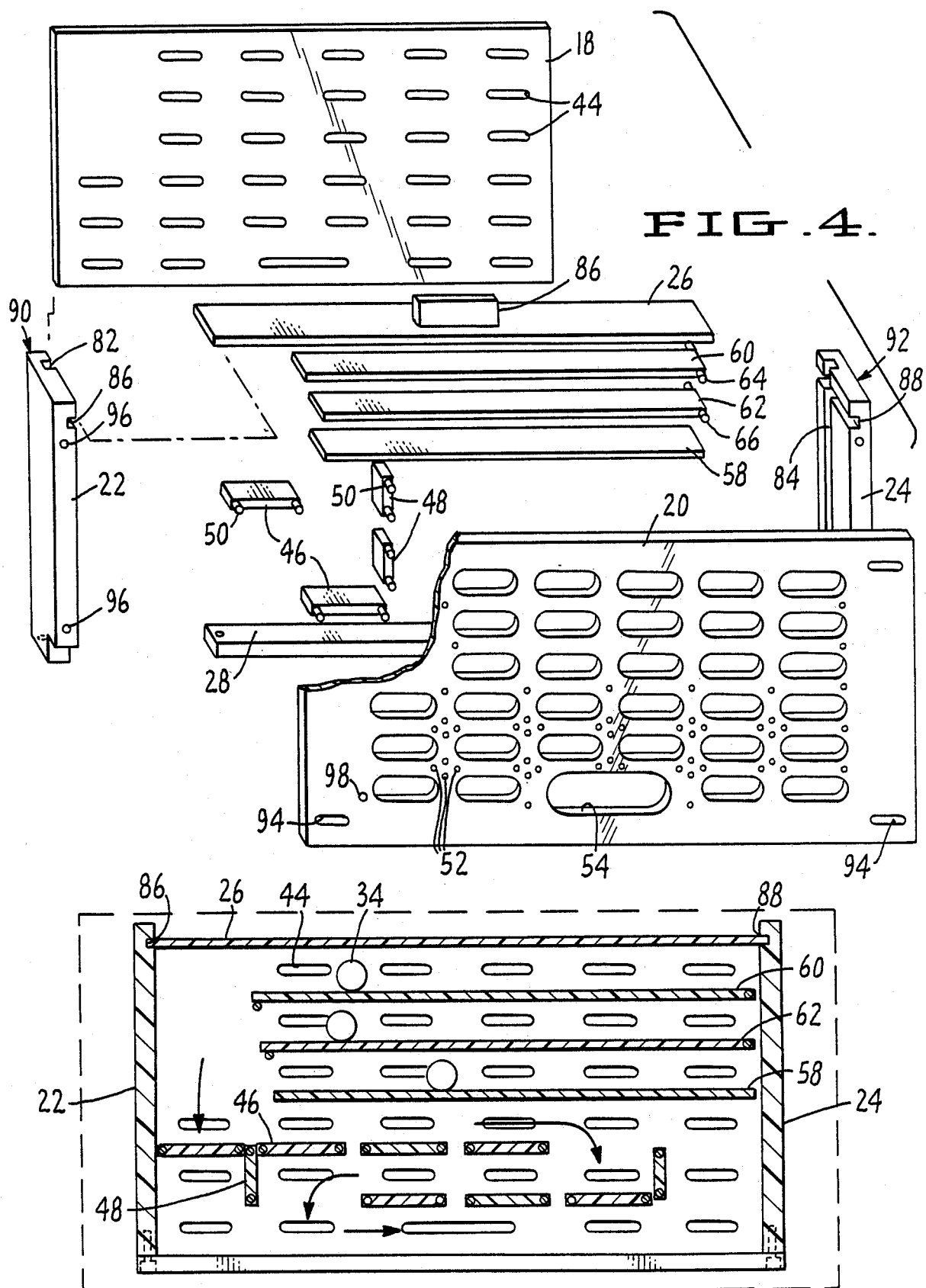

VARIABLE MAZE DEVICE

CROSS-REFERENCE TO RELATED APPLICATIONS

This application is a continuation-in-part of application Ser. No. 06/878,999, filed June 26, 1986 now U.S. Pat. No. 4,727,825, issued Mar. 1, 1988.

FIELD OF THE INVENTION

This invention relates generally to instructional toys, and more particularly relates to a variable and programmable maze device useful both for instructing caged research primates and for educating and entertaining children, e.g., as a crib toy.

BACKGROUND OF THE INVENTION

Primate instructional devices are known in the art. These devices typically serve the dual purposes of both educating the primate and enriching the primate's environment. There is increasing awareness that captive primates in civilized environments require mental stimulation to maintain health, strength and well-being. In fact, government regulation now mandates such humane treatment of caged primates.

Several such devices are designed for a primate to guide an object through a maze, i.e. by simulating "foraging" for a morsel of food so that the primate may retrieve the food at the end of a maze. Normally, however, a primate can learn a maze structure fairly rapidly, and the simpler, fixed maze-type educational devices are thus quickly stripped of their utility. Another drawback of many of these devices is that with more difficult mazes, which a primate may not learn absent some degree of instruction, there is no way to actually "teach" the primate to maneuver an object through the maze.

Thus, there is a need in the art for an educational device which is provided with (1) a variable rather than a fixed maze structure, and (2) a means for instructing the primate through the maze. The variable maze device of the present invention is directed to each of these considerations, and in addition, can be used as a crib toy to instruct and entertain infant children.

SUMMARY OF THE INVENTION

Accordingly, it is an object of the present invention to provide a device for enriching the environment of a contained primate or a human infant, which device includes a variable and programmable maze structure.

It is another object of the present invention to provide an educational device having a means for instructing a contained primate or a human infant through the maze.

It is still another object of the present invention to provide such a device having varying and programmable degrees of difficulty.

It is a further object of the present invention to provide such a variable maze device attachable to a fixture such as to the exterior or to the interior of a primate cage or crib, the maze structure of the device being accessible from both inside and outside the crib.

It is still a further object of the present invention to provide such a variable maze device having a plurality of movable connecting stops within a container means, the connecting stops providing a continuous and variable pathway within the device.

Additional objects, advantages and novel features of the invention will be set forth in part in the description which follows, and in part will become apparent to those skilled in the art on examination of the following, or may be learned by practice of the invention.

In one aspect of the present invention, a variable maze device is provided which can be placed in an infant's crib, serving both as a toy and as an instructional means. The device provides entertainment as well as tactile and visual stimulation for the infant and, further, encourages development of hand-eye coordination, visual acuity, dexterity, and analytical skill.

As the device may be programmed to provide mazes of varying difficulty, once the maze is learned by the infant, the device may be readily "reprogrammed" to give a more difficult maze. This is in contrast to most infant instructional devices that are learned fairly quickly and thus readily stripped of their utility.

In a preferred embodiment, the device comprises a container means attachable to a crib wall, the container means including a variable, programmable maze structure accessible from both inside and outside the crib. In a preferred embodiment, the container means is provided with opposing panels having substantially oppositely disposed access ports, and further is provided with a plurality of movable connecting stops defining a variable and continuous pathway within the container means.

BRIEF DESCRIPTION OF THE DRAWINGS

FIG. 4 is an exploded, frontal view of the variable maze device.

FIG. 5 is a partially sectional front elevational view of the variable maze device.

DETAILED DESCRIPTION OF THE INVENTION

Figure 1:
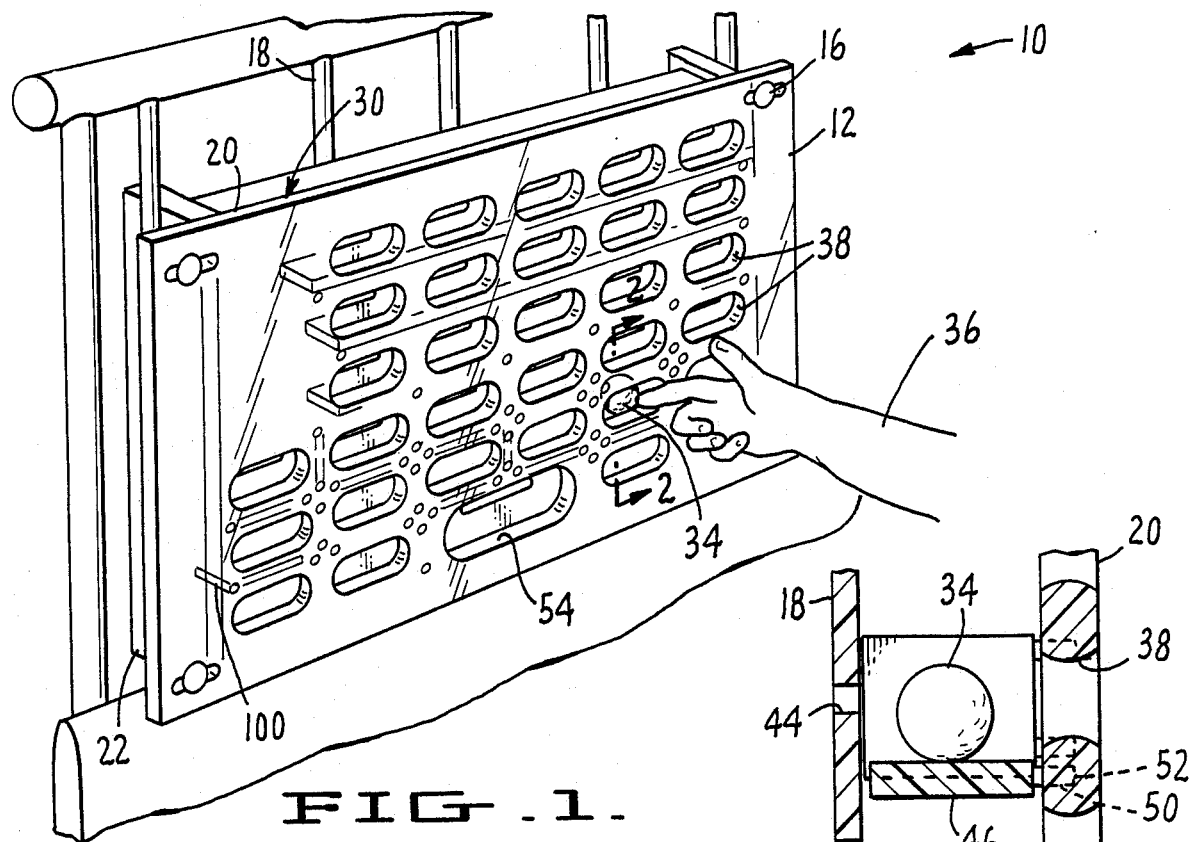
FIG. 1 is a perspective view of the variable maze device as seen from inside a cage or crib.

In FIG. 1, the variable maze device is illustrated generally at 10. Container means 12 is attachable to a fixture of a primate's or infant's environment such as to either side of cage or crib wall 14 by means of fasteners 16. Rear panel 18 of the container means rests adjacent wall 14, and directly opposes front panel 20 to which it is connected by means of side connecting strips 22 and 24 and top and bottom 26 and 28, respectively (see FIG. 3).

The interior 30 of the container means is provided with a variable maze structure 32 manually programmable to varying degrees of difficulty as will be described. Token 34 which serves as a reward for successful completion of the maze may be manipulated by the primate or infant 36 through frontal access ports 38 along continuous pathway 40. The device incorporates a means for instructing the primate or infant (i.e., individual whose hand is represented by "36") as to the location of pathway 40 by virtue of rear access ports 44 substantially directly opposing frontal access ports 38. Thus, an individual outside the contained space, i.e., the primate cage or an infant's crib may manipulate token 34 along continuous pathway 40 through rear access ports 44 so that the primate or infant may observe the location of that pathway.

Figure 2:
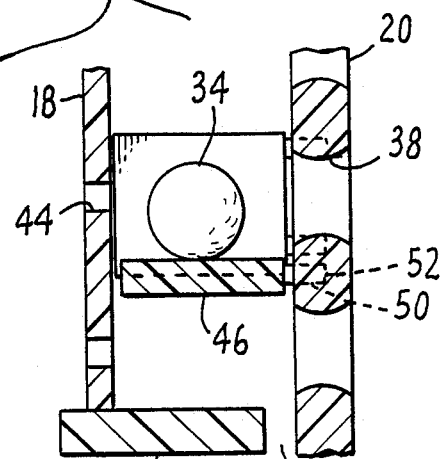
FIG. 2 is an enlarged, sectional view of the lower portion of the variable maze device taken along the 2—2 lines of FIG. 1.

Turning now to the remaining figures, movable connecting stops 46 (horizontal) and 48 (vertical) define continuous pathway 40. Because these stops are movable within the container means, a variety of continuous pathways—i.e., "maze" structures—may be created. As best seen in FIG. 2, each of movable stops 46 and 48 are provided with pegs 50 adapted to fit snugly within recesses 52 in front panel 20.

Frontal access ports 38 are smaller than food morsel 34, so that the primate or infant may not remove the food without successfully "completing" the maze, i.e. moving the food through the maze to exit port 54, which is larger than token 34. When the device is attached to a meshed wall, care should be taken that bars of the mesh do not block access to exit port 54. Rear access ports 44 are also smaller than token 34, but are large enough to allow external maneuvering of the food within the maze with a rod or similar structure.

FIG. 2 also illustrates drainage port 56 located within bottom 28. Drainage port 56 allows for automatic drainage of any fluid which may accumulate within the device during cleaning.

Figure 3:
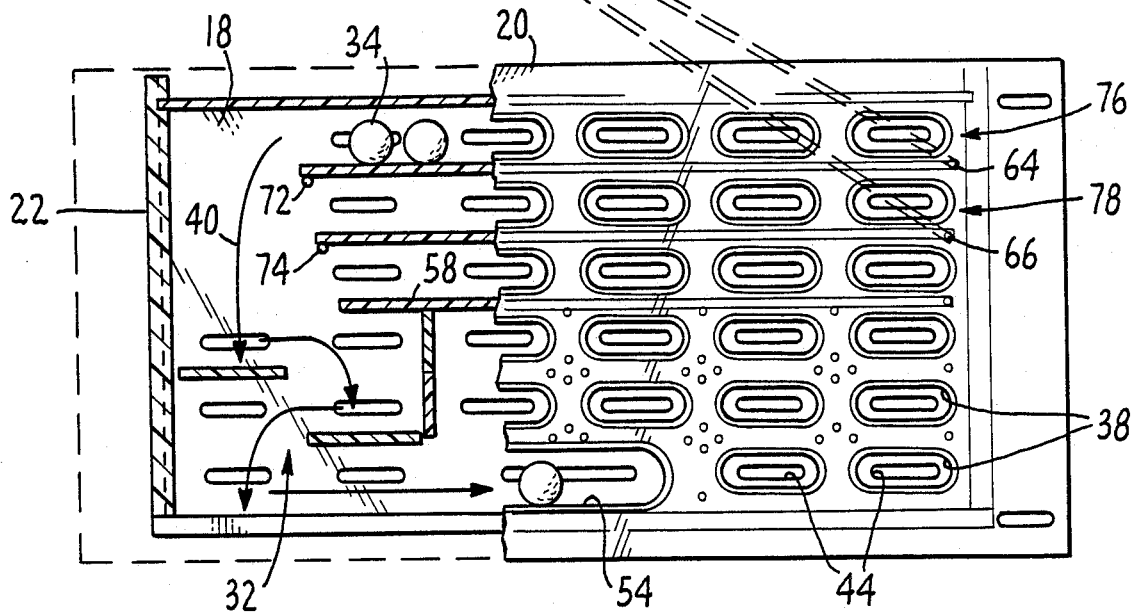
FIG. 3 is a partially sectional rear elevational view of the variable maze device, and illustrates the upper ledges in pivoted position.

FIG. 3 illustrates the mechanism by which token 34 is placed within container means 12 for manipulation through continuous pathway 40 by the primate or infant.

Upper and lower pivotable shelves 60 and 62 are affixed at one end to pivot pins 64 and 66, respectively, while free ends 68 and 70 of the shelves rest on upper and lower supports 72 and 74. When the token is to be placed within container means 12 at the start of the maze—at the top of continuous pathway 40, either or both of shelves 60 and 62 may be pivoted upwards to allow placement of the token in channels 76, 78 or 80. In the embodiment shown, fixed shelf 58 may not be pivoted upward. In an alternative embodiment, shelves 58, 60 and 62 may be replaced partially or entirely with additional movable stops 46 and 48 to expand the maze structure.

FIG. 4 illustrates how the inventive device is assembled. As may be seen, the device is structured so as to be assembled and disassembled quickly and easily. Rear panel 18 of the container means slides into place by means of vertical grooves 82 and 84 on side connecting strips 22 and 24. Similarly, top 26 slides into horizontal grooves 86 and 88 located at the upper ends 90 and 92 of the side strips 22 and 24. Handle 86 facilitates movement of top 26. Because rear panel 18 is actually somewhat shorter than front panel 20 (see FIG. 3), top 26 may be removed without first removing rear panel 18. Thus, the token may be placed within channels 76, 78 or 80 without substantial disassembly of the device.

Front panel 20 is fastened in place, as noted above, by fasteners 16, which may be in the nature of bolts, hooks, brackets, and the like. Preferred fasteners include J-bolts and cable ties. Fasteners 16 fit through openings 94 at each of the four corners of front panel 20 and attach the device to a fixture such as cage wall 14. Openings 98 of front panel 20 are positioned so as to be aligned with elongated apertures 96 within side panels 22 and 24, thus allowing a through path for secondary fasteners 100.

After placement of token 34 within container means 12, an individual outside the cage or crib may maneuver the token along the continuous pathway 40 in order to teach the primate or infant the location of that pathway.

After the correct path through a particular maze is learned, the rear panel 18 may be removed as described above, and a different and, if desired, more difficult maze structure may be created by rearranging movable stops 46 and 48. At least two dozen different maze configurations may be obtained with the instant device.

While the invention has been described in conjunction with the preferred specific embodiments thereof, it will be understood that this description is intended to illustrate and not limit the scope of the invention, which is defined by the appended claims.

I claim:

1. A variable maze device for use as a crib toy, comprising a container means having a variable maze through which a human infant can move an object, said maze being programmable to varying degrees of difficulty and said container means provided with a rear panel, an opposing front panel, and an interior therebetween, said front and rear panels having a plurality of substantially oppositely disposed access ports through which access to said interior of said container means may be had through each of said front and rear panels, wherein said device includes a means for instructing the infant as to the location of the correct path through the maze, said instructing means comprising a means for manipulating said object within said device through said rear panel, infant access to said object being through said front panel.

2. The variable maze device of claim 1, wherein said container means is attachable to a crib wall environment.

3. The device of claim 2, wherein said variable maze comprises a plurality of movable connecting stops adapted to fit between said front and rear panels adjacent said access ports, whereby a continuous and variable pathway is provided within said container means.

4. The device of claim 3, wherein said object is larger than said access ports, so that removal of said object from said container means through said access ports is prevented.

5. The device of claim 4, wherein said front panel of said container means is provided with an exit port larger than said object, thereby allowing removal of said object from said container means through said exit port.

6. The device of claim 1, wherein said object is a token used by the infant to achieve an additional reward.

7. The device of claim 1, wherein said container means is structured so as to be quickly and easily assembled and disassembled, facilitating replacement of said object within said container means and modification of said continuous pathway.

8. The device of claim 7, wherein said access ports within said front panel are structured so that an infant in said crib may manipulate said object within said container means through said continuous pathway and remove said object through said exit port of said container means.

9. In a method for confining a human infant in a contained space, the improvement comprising placing in said contained space a variable maze device comprising a container means having a variable maze through which a human infant can move an object, said maze being programmable to varying degrees of difficulty and said container means provided with a rear panel, an opposing front panel, and an interior therebetween, said front and rear panels having a plurality of substantially oppositely disposed access ports through which access to said interior of said container means may be had through each of said front and rear panels, wherein said device includes a means for instructing the infant as to the location of the correct path through the maze, said instructing means comprising a means for manipulating said object within said device through said rear panel, infant access to said object being through said front panel.

* * * * *